S. P. FORGY.
Bee Hive.
No. 80,716. Patented Aug. 4, 1868.
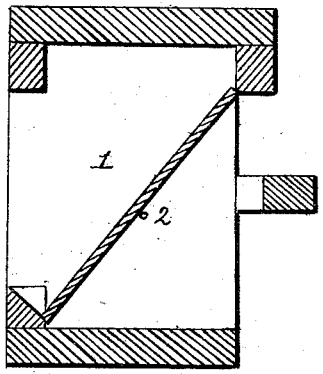
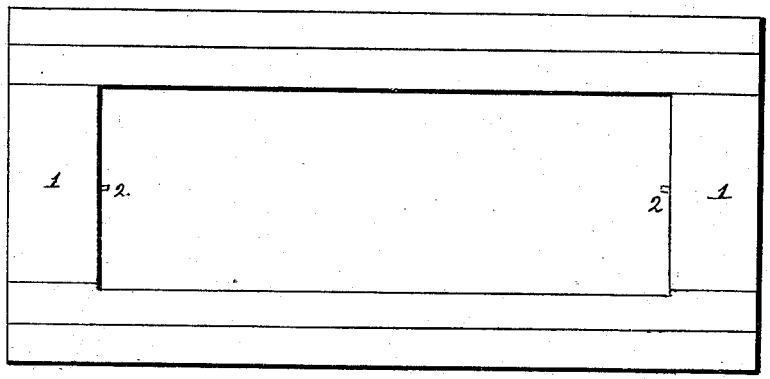
Witnesses:
Inventor:

United States Patent Office.

SAMUEL P. FORGY, OF ALLENSVILLE, KENTUCKY.

Letters Patent No. 80,716, dated August 4, 1868.

IMPROVEMENT IN BEE-HIVES.

*The Schedule referred to in these Letters Patent and making part of the same.*

TO ALL WHOM IT MAY CONCERN:

Be it known that I, SAMUEL P. FORGY, of the town of Allensville, in the county of Todd, and State of Kentucky, have invented a new and useful Method of Preventing the Entrance of Moth or other Insects into Bee-Hives; and I do hereby declare that the following is a full, clear, and exact description of the construction and operation of the same, reference being had to the accompanying drawings, and to the letters of reference marked thereon, making a part of this specification.

The nature of my invention consists in providing a transparent shield or plate in a frame or box to be inserted or suspended on pivots, (marked,) box 1, pivots 2 2, in the accompanying drawing.

The plate in the box or frame, which may be inserted in any description of a hive, is so adjusted as to perfectly close the entrance to the hive, resting as an inclined plane at or about an angle of forty-five degrees, and in such way and manner that when the bee approaches, it passes up this inclined plane, when its own weight balances the plate, which produces an aperture or opening into the hive, and on passing out, the bee, on approaching the light, raises the transparent shield or plate, and passes under it, when it at once adjusts itself, closing the aperture perfectly, and preventing the entrance of moth or other insects into the hive.

What I claim as my invention, and desire to secure by Letters Patent, is—

The application, to the box or frame, of the self-adjusting transparent light on pivots, which will, at a given or proper time, allow the bee both ingress and egress, as herein described, using for that purpose any transparent substance which will produce the intended effect.

S. P. FORGY.

Witnesses:
    S. T. FORTUNE,
    W. M. THOMAS.